US009426261B2

(12) United States Patent
Asterjadhi et al.

(10) Patent No.: US 9,426,261 B2
(45) Date of Patent: Aug. 23, 2016

(54) APPARATUS AND METHODS FOR IMPROVED FRAMES

(71) Applicant: QUALCOMM Incorporated, San Diego, CA (US)

(72) Inventors: Alfred Asterjadhi, San Diego, CA (US); Simone Merlin, Solana Beach, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 14/266,435

(22) Filed: Apr. 30, 2014

(65) Prior Publication Data

US 2014/0341234 A1    Nov. 20, 2014

Related U.S. Application Data

(60) Provisional application No. 61/823,866, filed on May 15, 2013.

(51) Int. Cl.
*H04L 29/08* (2006.01)
*H04L 1/00* (2006.01)
*H04W 84/12* (2009.01)
*H04L 29/06* (2006.01)
*H04W 28/06* (2009.01)
*H04L 1/16* (2006.01)

(52) U.S. Cl.
CPC ............ *H04L 69/324* (2013.01); *H04L 1/0083* (2013.01); *H04L 69/22* (2013.01); *H04W 28/06* (2013.01); *H04W 84/12* (2013.01); *H04L 1/165* (2013.01); *H04L 1/1614* (2013.01)

(58) Field of Classification Search
CPC ..... H04L 69/324; H04L 69/22; H04L 1/0083; H04L 1/165; H04L 1/1614; H04W 84/12
See application file for complete search history.

(56) References Cited

U.S. PATENT DOCUMENTS

| 2006/0018332 A1* | 1/2006 | Kakani et al. ............... 370/428 |
| 2006/0050742 A1* | 3/2006 | Grandhi et al. ............. 370/506 |
| 2006/0142004 A1* | 6/2006 | He et al. .................... 455/434 |
| 2007/0186134 A1* | 8/2007 | Singh et al. ................ 714/749 |

(Continued)

FOREIGN PATENT DOCUMENTS

WO    WO-2012159082 A2    11/2012

OTHER PUBLICATIONS

International Search Report and Written Opinion—PCT/US2014/036443—ISA/EPO—Jul. 31, 2014.

(Continued)

*Primary Examiner* — Mohammad Anwar
(74) *Attorney, Agent, or Firm* — Knobbe Martens Olson & Bear LLP

(57) ABSTRACT

Systems, methods, and devices for communicating frames in a wireless network are disclosed. In one aspect, a method includes determining a protocol version field value for a frame control field of a wireless message, generating the frame control field, the frame control field generated to comprise a protocol version field having the protocol version field value, and a type field having a length based on the protocol version field value, generating the wireless message, the wireless message comprising a media access control header, the media access control header comprising the frame control field; and transmitting the wireless frame.

23 Claims, 14 Drawing Sheets

(56) References Cited

U.S. PATENT DOCUMENTS

2011/0149760 A1* 6/2011 Shrivastava et al. .......... 370/252
2013/0023227 A1* 1/2013 Yokoyama ................. 455/404.1
2013/0077610 A1* 3/2013 Amini et al. .................. 370/338
2013/0201983 A1* 8/2013 Ghosh et al. ................. 370/357

OTHER PUBLICATIONS

Merlin S ., "Channel indication in RAW/TWT , 11-13-0071-00-00ah-channel-indication-in-raw-twt", IEEE SA Mentor, 11-13-0071-00-00AH-Channel Indication-In-RAW-TWT, IEEE-SA Mentor, Piscataway, NJ USA, vol. 802. 11ah, Jan. 15, 2013, pp. 1-14, XP068040469, [retrieved on Jan. 15, 2013].

Diepstraten, W. et al., "Proposed Revisions to the MAC Frame Formats. , 1194254A", IEEE DRAFT, 1194254A, IEEE-SA, Piscataway, NJ USA, vol. 802.11, Mar. 19, 2001, pp. 1-9, XP017606537, [retrieved on Mar. 19, 2001].

* cited by examiner

FIG. 3

| Octets | 2 | 2 | 6 | 6 | 6 | 2 | 6 | 2 | 4 | 0-7951 | 4 |
|---|---|---|---|---|---|---|---|---|---|---|---|
| | Frame Control | Duration/ID | Address 1 | Address 2 | Address 3 | Sequence Control | Address 4 | QOS Control | HT Control | Frame Body | FCS |
| | 305 | 310 | 315 | 320 | 325 | 330 | 335 | 340 | 345 | 350 | 355 |

| Bits | 2 | 2 | 4 | 1 | 1 | 1 | 1 | 2 |
|---|---|---|---|---|---|---|---|---|
| | Protocol Version | Type | Subtype | Bandwidth Indication | Dynamic Indication | Next TWT Present | More Data | SIG Control Extension |
| | 405a | 410a | 415a | 420a | 425a | 430a | 435a | 440a |

| Bits | 2 | 4 | 2 | 1 | 1 | 1 | 1 | 2 |
|---|---|---|---|---|---|---|---|---|
| | Protocol Version | Type | Subtype | Bandwidth Indication | Dynamic Indication | Next TWT Present | More Data | Reserved |
| | 405b | 410b | 415b | 420b | 425b | 430b | 435b | 445b |

305b

| Octets: 2 | 2 | 6 | 6 | 1 | 5 | 0 or 6 | 4 |
|---|---|---|---|---|---|---|---|
| FC | Duration | RA (A1) | TA (A2) | Beacon Sequence | Partial Timestamp | Next TWT (Optional) | FCS |
| 505 | 510 | 515 | 520 | 525 | 530 | 535 | 540 |

| Bits: 2 | 4 | 2 | 1 | 1 | 1 | 1 | 1 | 1 | 1 |
|---|---|---|---|---|---|---|---|---|---|
| Protocol Version | Type | Subtype | Bandwidth Indication | Dynamic Indication | Next TWT Present | More Data | Relay Flow Suspended | Reserved |
| 550 | 555 | 560 | 565 | 570 | 575 | 580 | 585 | 590 |

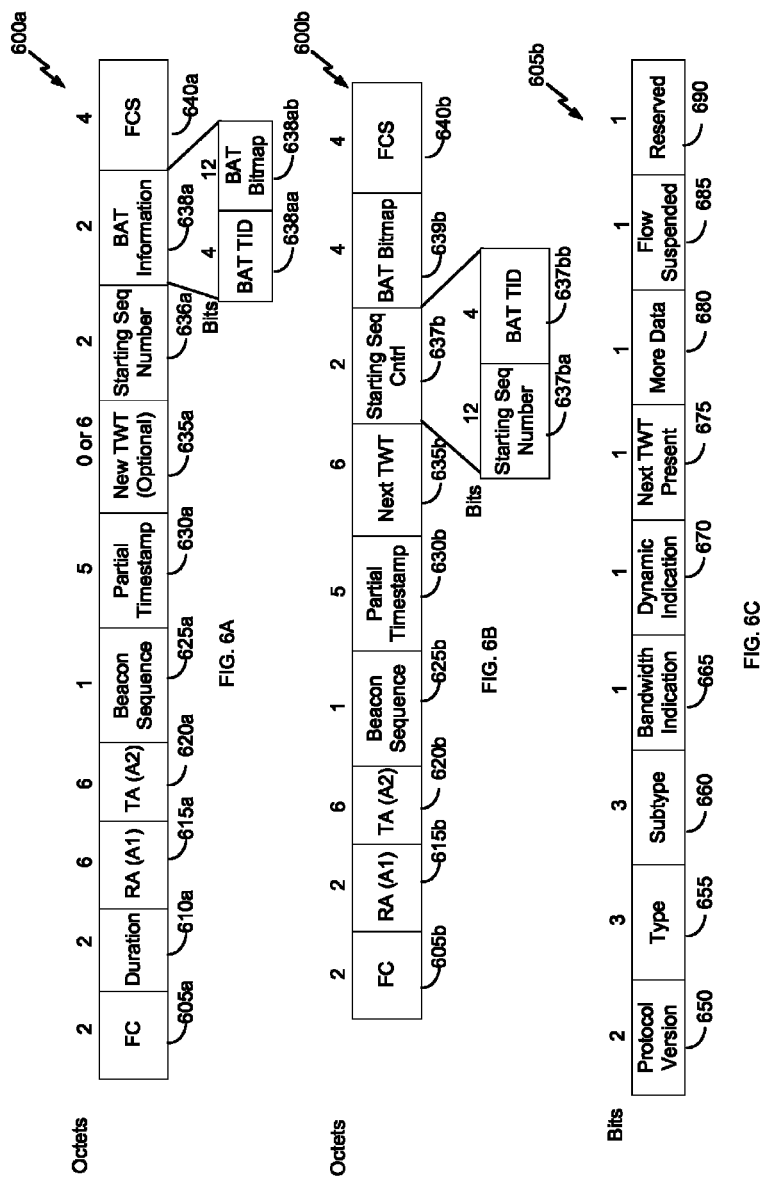

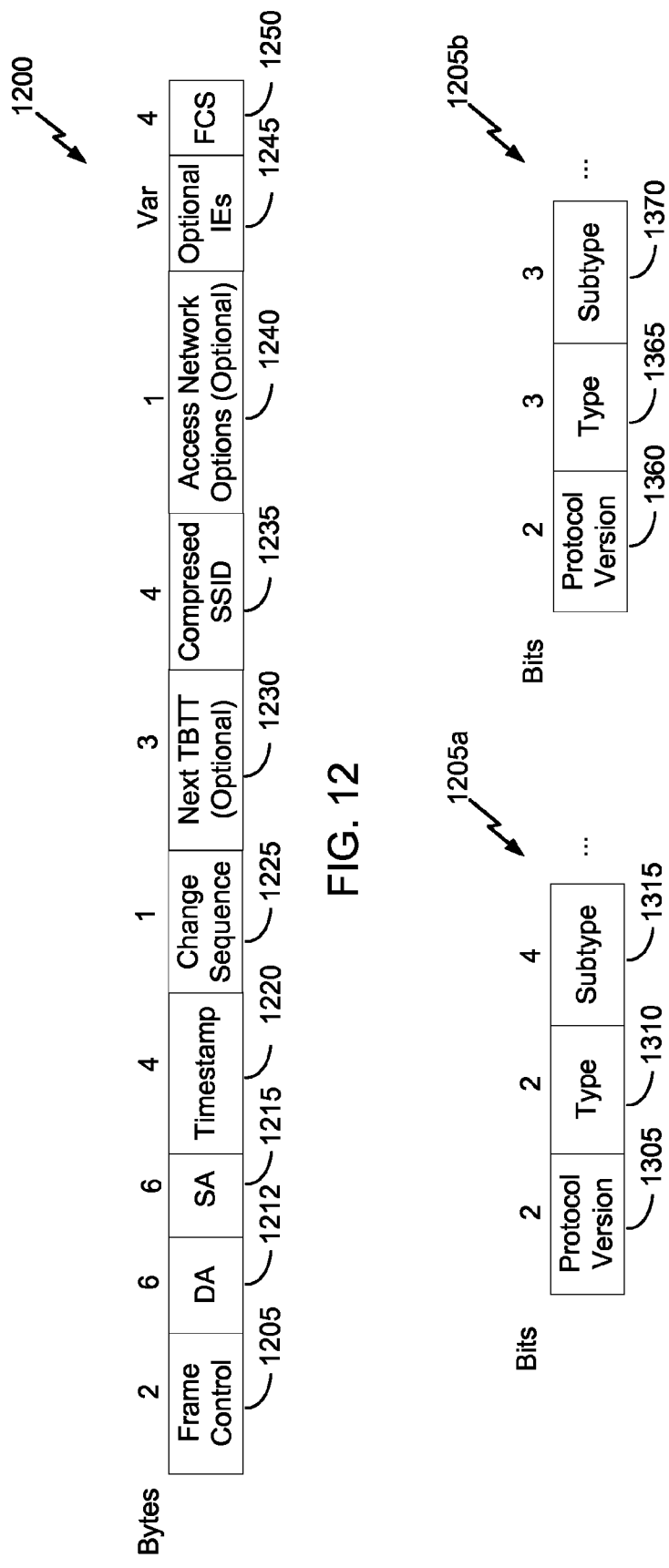

APPARATUS AND METHODS FOR IMPROVED FRAMES

CROSS REFERENCE TO RELATED APPLICATIONS

This application claims the benefit of U.S. Provisional Application 61/823,866, filed May 15, 2013, and entitled "APPARATUS AND METHODS FOR IMPROVED S1G CONTROL RESPONSE FRAMES," and assigned to the assignee hereof. The disclosure of this prior application is considered part of this application, and is hereby incorporated by reference in its entirety.

BACKGROUND

1. Field

The present application relates generally to wireless communications, and more specifically to systems, methods, and devices for transmitting and receiving control frames and management frames.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks. The devices in a wireless network may transmit/receive information between each other. The information may comprise management frames and/or control frames.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of management frames and/or control frames.

One aspect of the disclosure provides a method of communicating in a wireless network. The method includes generating a control frame, the control frame including a media access control header, the media access control header including a frame control field, the frame control field indicating whether a transmitter of the control frame will receive any data for a time period after transmission of the control frame, and transmitting the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the frame subtype is one of a short beacon, short probe response, RA frame, target wake time acknowledgement (TACK), a block acknowledgement target wake time (BAT), and a short target wake time acknowledgement (STACK) frame. In some aspects, the subtype of the frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect of the disclosure provides an apparatus for communicating in a wireless network. The apparatus includes a processor configured to generate a control frame, the control frame including a media access control header, the media access control header including a frame control field, the frame control field indicating whether a transmitter of the control frame will receive any data for a time period after transmission of the control frame, and a transmitter configured to transmit the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the frame subtype is one of a short beacon, short probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect disclosed provides an apparatus for communicating in a wireless network. The apparatus includes means for generating a control frame, the control frame including a media access control header, the media access control header including a frame control field, the frame control field indicating whether a transmitter of the control frame will receive any data for a time period after transmission of the control frame, and means for transmitting the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a Target Wake Time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect disclosed provides a computer readable storage medium storing instructions that when executed cause a processor perform a method of communicating in a wireless network. The method includes generating a control frame, the control frame including a media access control header, the media access control header including a frame control field, the frame control field indicating whether a transmitter of the control frame will receive any data for a time period after transmission of the control frame, and transmitting the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a short beacon, probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect of the disclosure provides a method of communicating in a wireless network. The method includes receiving a control frame, the control frame including a media access control header, the media access control header including a frame control field, the frame control field indicating whether a transmitter of the control frame will receive any data for a time period after transmission of the control frame, and processing the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a short beacon, probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect of the disclosure provides an apparatus for communicating in a wireless network. The apparatus includes a receiver configured to receive a control frame, the control frame including a media access control header, the media access control header including a frame control field, the frame control field indicating whether a transmitter of the control frame will receive any data for a time period after transmission of the control frame, and a processor configured to process the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a short beacon, probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect disclosed provides an apparatus for communicating in a wireless network. The apparatus includes means for receiving a control frame, the control frame including a media access control header, the media access control header including a frame control field, the frame control field indicating whether a transmitter of the control frame will receive any data for a time period after transmission of the control frame, and means for processing the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a short beacon, probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect disclosed provides a computer readable storage medium storing instructions that when executed cause a processor perform a method of communicating in a wireless network. The method includes receiving a control frame, the control frame including a media access control header, the media access control header including a frame control field, the frame control field indicating whether a transmitter of the control frame will receive any data for a time period after transmission of the control frame, and processing the control frame. In some aspects, the time period is indicated by a time reference included in the media access control header. In some aspects, the frame control field comprises a type field that is three or four bits in length. In some aspects, the frame control field comprises a subtype field that is two or three bits in length. In the disclosed implementations, the total length of the type and subtype fields combined is six (6) bits, regardless of the length of the individual fields.

In some aspects, the control frame subtype is one of a short beacon, probe response, RA frame, target wake time acknowledgement (TACK), a block acknowledgement target wake time (BAT), and a short target wake time acknowledgement (STACK) frame. In some aspects, the subtype of the control frame is indicated by a subtype field in the media access control header. In some aspects, the control frame is a block acknowledgement target wake time control frame, and the control frame indicates a receive status of up to 32 MSDUs and A-MSDUs. In some aspects, the control frame is a short target wake time acknowledgement, and the control frame indicates a next target wake time. In some aspects, whether the control frame indicates a next target wake time is indicated by a next target wake time present field in the frame control field. In some aspects, the next target wake time is indicated by the media access control header.

Another aspect disclosed is a method of communicating in a wireless network. The method includes determining a protocol version field value for a frame control field of a wireless message, generating the frame control field, the frame control field generated to comprise a protocol version field having the protocol version field value, and a type field having a length based on the protocol version field value, generating the wireless message, the wireless message comprising a media access control header, the media access control header comprising the frame control field; and transmitting the wireless frame.

In some aspects, the method also includes generating the frame control field to further comprise a subtype field, a length of the subtype field based on the protocol version field value or the length of the type field. In some aspects, the method includes determining that the length of the type field is greater than or equal to the length of the subtype field if the protocol version field value is equal to a first value, and determining that the length of the type field is less than the length of the subtype field if the protocol version field value is equal to a second value.

In some aspects, the method also includes generating the type field to have a first value and the subtype field to have a second value, the value of the type field and the value of the subtype field indicating the wireless frame is a probe response frame. In some aspects, the method also includes generating the type field to have a third value and the subtype field to have a fourth value, the value of the type field and the value of the subtype field indicating the wireless frame is a resource allocation frame. In some aspects, the method also includes generating the frame control field of the resource allocation frame to comprise a group indication field.

Another aspect disclosed is an apparatus for communicating in a wireless network. The apparatus includes a processing system configured to: determine a protocol version field value for a frame control field of a wireless message; generate the frame control field, the frame control field generated to comprise a protocol version field having the protocol version field value, and a type field having a length based on the protocol version field value; generate the wireless message, the wireless message comprising a media access control header, the media access control header comprising the frame control field; and transmit the wireless frame.

In some aspects, the processing system is further configured to generate the frame control field to further comprise a subtype field, a length of the subtype field based on the protocol version field value or the length of the type field.

In some aspects, the processing system is further configured to determine that the length of the type field is greater than or equal to the length of the subtype field if the protocol version field value is equal to a first value, and determine that the length of the type field is less than the length of the subtype field if the protocol version field value is equal to a second value.

In some aspects, the processing system is further configured to generate the type field to have a first value and the subtype field to have a second value, the value of the type field and the value of the subtype field indicating the wireless frame is a probe response frame.

In some aspects, the processing system is further configured to generate the type field to have a third value and the subtype field to have a fourth value, the value of the type field and the value of the subtype field indicating the wireless frame is a resource allocation frame. In some aspects, the processing system is further configured to generate the frame control field of the resource allocation frame to comprise a group indication field.

Another aspect disclosed is a method of communicating in a wireless network. The method includes receiving a wireless communication frame; decoding the wireless communication frame to identify a media access control header; decoding the media access control header to identify a frame control field; decoding the frame control field to determine a value of a protocol version field; determining a length of a type field in the frame control field based on the value of the protocol version field; determining a value of the type field based on the length, and processing the wireless communication frame based on the type field value.

In some aspects, the method includes decoding the frame control field to further determine a length of a subtype field based on the protocol version field value or the length of the type field; and determining a value of the subtype field based on the length of the subtype field.

In some aspects, the method also includes determining that the length of the type field is greater than or equal to the length of the subtype field if the protocol version field value is equal to a first value, and determining that the length of the type field is less than the length of the subtype field if the protocol version field value is equal to a second value. In some aspects, the method also includes determining the type field has a first value and the subtype field has a second value; decoding the wireless communication frame as a probe response frame based on the determination.

In some aspects, the method also includes determining the type field has a third value and the subtype field has a fourth value; and decoding the wireless frame as a resource allocation frame based on the determination. In some aspects, the method also includes decoding a group indication field in the frame control field based on the wireless frame being a resource allocation frame.

BRIEF DESCRIPTION OF THE DRAWINGS

FIG. 3 illustrates an example of a legacy media access control frame.

FIG. 4A illustrates an example of a legacy frame control field for a S1G control response frame.

FIG. 4B illustrates an example of a proposed frame control field for a S1G Control response frame.

FIG. 5A shows one embodiment of a target wake time acknowledgement (TACK) media access control header.

FIG. 5B shows an example format for the frame control field.

FIG. 6A shows one embodiment of a block acknowledgement target wake time (BAT) media access control header.

FIG. 6B shows one embodiment of a block acknowledgement target wake time (BAT) media access control header.

FIG. 6C shows an example format for a frame control field.

FIG. 12 shows an example format of a short probe response frame.

FIG. 13A shows an example of a portion of a frame control field.

FIG. 13B shows an example of a portion of a frame control field.

DETAILED DESCRIPTION

Figure 1:
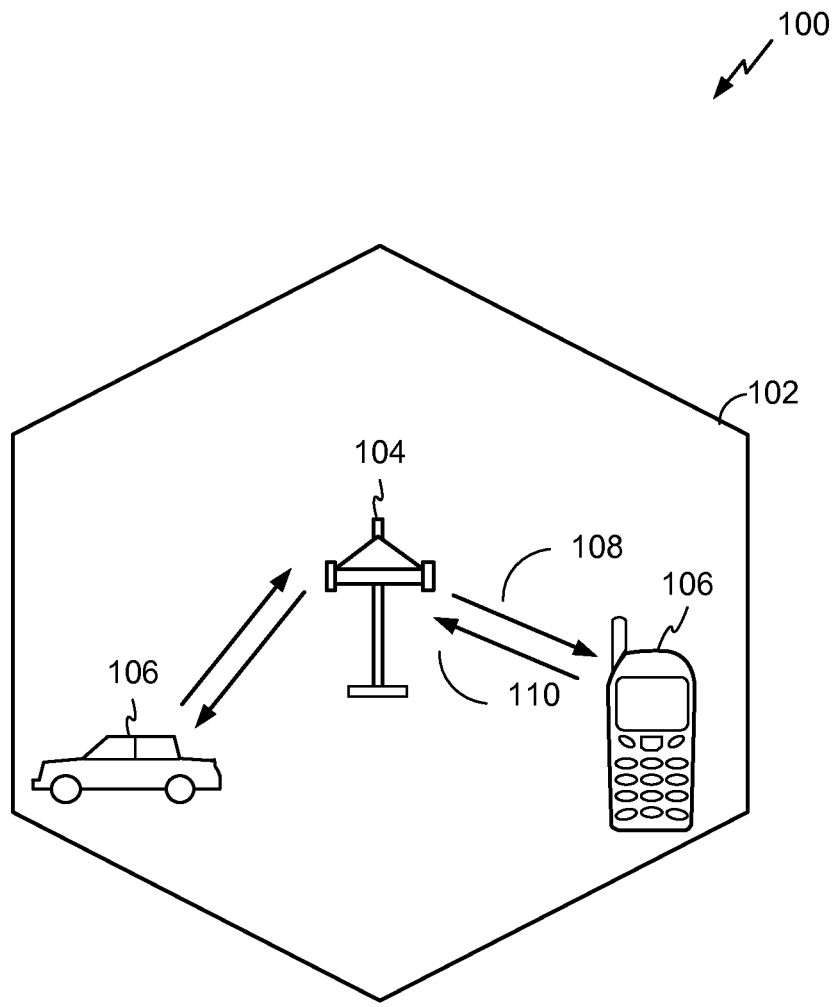
FIG. 1 illustrates an example of a wireless communication system in which aspects of the present disclosure may be employed.

Various aspects of the novel systems, apparatuses, and methods are described more fully hereinafter with reference to the accompanying drawings. The teachings may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Some methods and apparatus for communication may utilize frames that include unnecessary or inefficiently organized information. This inefficiency may result in frames that are longer than they necessarily need to be. These longer frames consume processing power and network bandwidth that, in at least some environments, may be more efficiently used for performing other operations on a wireless network. Therefore, improved frame formats that provide for more efficient organization of information in wireless frames is desired.

Some aspects disclosed herein provide for control and/or management frame types of a reduced length when compared to known control and/or management frames. These frames of reduced length may be referred to as "short" management frames or "short" control frames. Generally, when referring to "short" frames, the referred to frame formats are of a reduced length when compared to known frame types.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
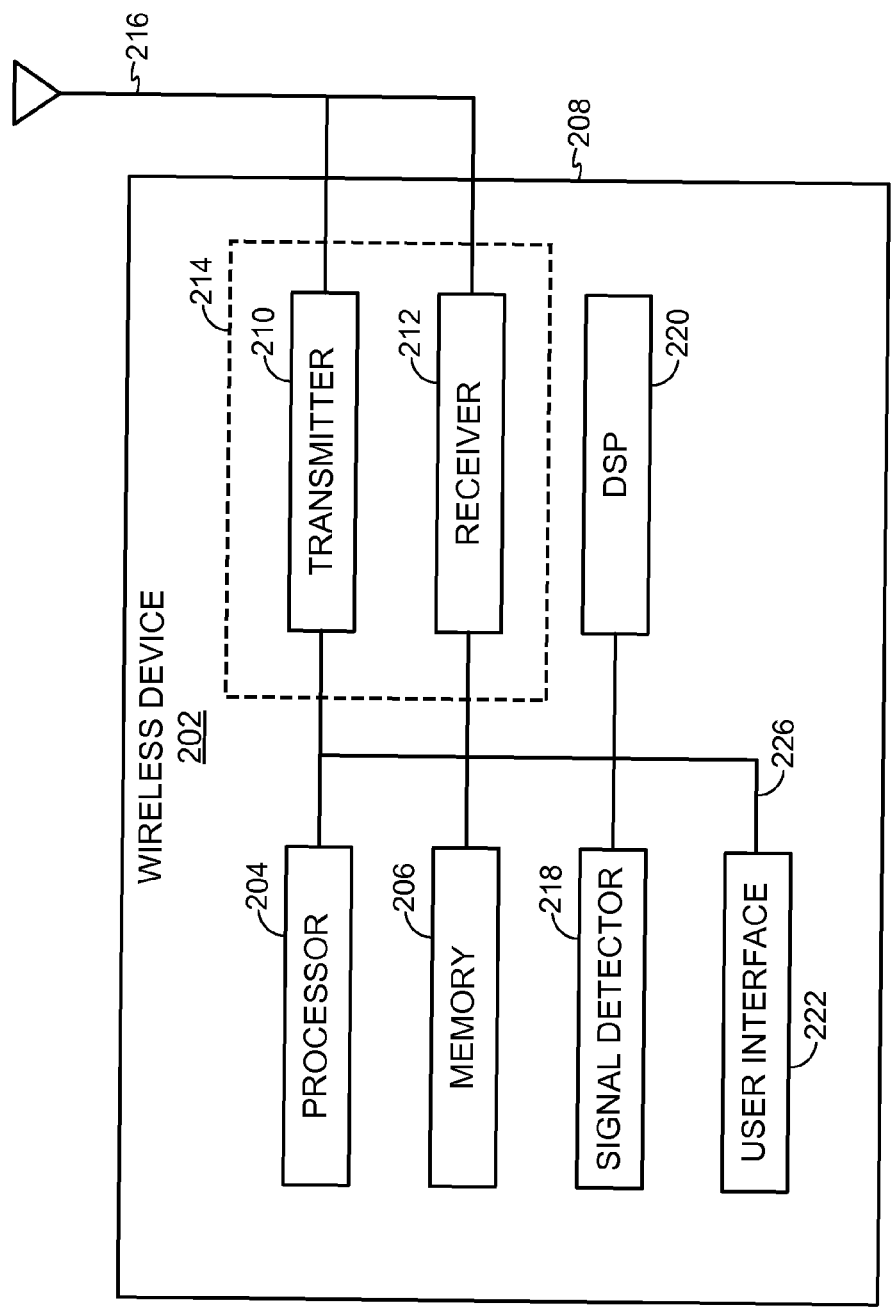
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to generate control frames and/or management frames using multiple formats. Further, processor 204 may be configured to select one of a plurality of control and/or management frame formats that correspond to a control and/or management frame type, and to generate a packet having that control frame type and/or management frame type.

When the wireless device 202 is implemented or used as a receiving node, the processor 204 may be configured to process control frames and/or management frames of different types and/or formats. For example, the processor 204 may be configured to determine the type of control frame and/or management frame received and process the control frame and/or management frame accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit one or more types of control frames and/or management frames formatted using one or more frame type formats. For example, the transmitter 210 may be configured to transmit control frames and/or management frames generated by the processor 204, discussed above.

The receiver 212 may be configured to wirelessly receive one or more types of control frames and/or management frames. In some aspects, the receiver 212 is configured to detect a type of control frame and/or management frame and process the frame accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive control frames and/or management frames of different types and/or different formats.

FIG. 3 illustrates an example of a legacy media access control frame 300. As shown, the media access control frame 300 includes 11 different fields: a frame control (fc) field 305, a duration/identification (duration) field 310, a first address field 315 (also referred to as a receiver address (a1)), a second address field 320 (also referred to as a transmitter address (a2)), a third address field (also referred to as a destination address (a3)), a sequence control (sc) field 330, a fourth address field 335, a QOS control field 340, a HT control field 345, a frame body 335, and a frame check sequence (FCS) field 340. Each of the first address, second address, and third address field 315-325 comprises a full MAC address of a device, which is a 48-bit (6 octet) value. FIG. 3 further indicates the size in octets of each of the fields 305-355.

FIG. 4A illustrates an example of a legacy frame control field 305a for a S1G control response frame. As shown, the legacy frame control field 305a includes 8 different fields: a protocol version field 405a, a type field 410a, a subtype field 415a, a bandwidth indication field 420a, a dynamic indication field 425a, a next Target Wake Time (TWT) present field 430a, a more data field 435a, and a sig control extension field 440a.

A S1G control response frame utilizes a protocol version field 405a set to zero, and a type field 410a set to 0x01 (control). In some aspects, the subtype field 410a may also be set to a particular value to indicate a particular type of S1G control response frame. The S1G Control Extension field 440a will also be set to a particular value depending on the type of control extension frame being transmitted. Therefore, use of the frame control field 305a in this way to indicate a particular control extension frame requires the use of a total of ten (10) bits (two bits for protocol version, two bits for type, four bits for subtype, and 2 bits for S1G Control Extension) of the total of 16 bits available in the frame control field 305 just to indicate the type of frame being communicated. Therefore, a more efficient method of indicating a particular type of S1G Control frame is needed to reduce the number of bits used. By reducing the number of bits used to indicate a particular type of S1G Control frame, some bits of a frame control field may be allocated for other purposes.

FIG. 4B illustrates an example of a proposed frame control field 305b. In some aspects, frame control field 305b may be included in a media access control frame, such as media access control frame 300 of FIG. 3 (substituted for frame control field 305). In some aspects, frame control field 305b may be included in a S1G Control response frame. As shown, the new frame control field 305b includes eight (8) different fields: a protocol version field 405b, a type field 410b, a subtype field 415b, a bandwidth indication field 420b, a dynamic indication field 425b, a next target wake time (TWT) present field 430b, a more data field 435b, and a reserved field 445b.

In contrast to the frame control field 305a illustrated in FIG. 4A which utilizes a type field 410a that is two bits in length, the type field 410b of frame control field 305b can be longer, for example three or four bits long. By increasing the number of bits utilized to indicate a type of a media access control frame, a more efficient utilization of bits of the frame control field 305b may be achieved relative to frame control field 305a that utilizes a smaller type field 410a. The length of subtype field 415b of frame control field 305b can be reduced relative to frame control field 305a, for example it can be three or even two bits long. Given the larger number of frame types that may be indicated by frame type field 410b relative to frame type field 410a, a fewer number of subtypes may be needed, thus providing for or enabling a reduced size subtype field. Because a S1G control response frame may now be indicated using, for example, the three or four bit type field 410b and the three or two bit subtype field 415b of frame control field 305b, the S1G control extension field 440a of frame control field 305a is not necessary in some aspects of frame control field 305b. This may provide for a new reserved field 445b that is two bits long. In some embodiments described below, bits of the reserved field 445b may be allocated for various purposes that were not possible using the frame control field format 305a. In some aspects, the combined length of the type field 410b and the subtype field 415b is six bits. Therefore, in some aspects, when the type field 410b is three bits long, the subtype field 415b is also three bits long. In some other aspects, the type field is four bits long, and the subtype field is two bits long (as shown).

FIG. 5A shows one embodiment of a target wake time acknowledgement (TACK) media access control header 500. The TACK media access control header includes eight (8) different fields, a frame control field 505, a duration field 510, a receiver address field 515, a transmitter address field 520, a beacon sequence field 525, a partial timestamp field 530, a next target wake time field 535 and a frame check sequence field 540.

In some aspects, the frame control field 505 may conform with the frame control format 305a illustrated in FIG. 4A. In these aspects, the protocol version field 405a of the frame 500 may be set to zero. These aspects include a type field 410a that is two bits long and a subtype field 415a that is four bits long. In these aspects the two bits of the type field may be set to 11 and the subtype fields may identify the different subtypes of control response frames described herein. For example, one value of the subtype field 410a may identify frame 500 as a target wake time acknowledgement (TACK) frame. In another implementation, a value in the subtype field 415a may identify frame 500 as a target wake time acknowledgement (TACK) frame.

FIG. 5B shows an example format for the frame control field 505. The frame control field 505 includes a total of nine (9) different fields: a protocol version field 550, a type field 555, a subtype field 560, a bandwidth indication field 565, a dynamic indication field 570, a next target wake time field 575, a more data field 580, a relay flow suspended field (or Flow Control field) 585, and a reserved field 590. While the type field 555 is shown as 4 bits in length in FIG. 5B, in some aspects, the type field 555 may be three bits in length. Similarly, while the subtype field 560 is shown as being two bits in length in FIG. 5B, in some aspects, it may be 3 bits in length. The total length of the type and subtype fields in frame control field 505 is six (6) bits.

In some aspects, when the relay flow suspended field 585 is present in a frame control field, the next target wake time (TWT) field 535 in a media access control header, such as MAC header 500, may be referred to as a suspend duration field.

Protocol version field 550 of frame control field 505 may be set to one (0x01). The frame control field 505 of FIG. 5B differs from the example frame control field 305b discussed above. While frame control field 305b included the two bit reserved field 445b, frame control field 505 allocates those two bits to the relay flow suspended field 585 and the reserved field 590.

In some aspects, the relay flow suspended field 585 indicates that a device transmitting a frame that includes this frame control field 505 is requesting the recipient of the frame to suspend its data transmission to it for the duration of time indicated by the next target wake time (TWT) field 535. In other words, the relay flow suspended field 585 indicates whether a transmitter of the control frame including frame control field 505 will be able to receive any data for a time period indicated in the next TWT field after the transmission of the control frame. In some aspects, transmission of a response frame with frame control field 505 with the relay flow suspended field 585 set, for example to 1, performs a function substantially similar to a relay flow suspend action frame.

In some aspects, the transmission of a response frame with a frame control field 505 with the relay flow suspended field 585 clear performs a function substantially similar to a relay flow resume action frame. For example, in some aspects, a device transmitting a frame with the relay flow suspended field 585 set to zero cancels any outstanding flow suspension in effect for the transmitting device. In some embodiments, a frame that has this functionality of the relay flow resume may be a RTS or a CTS frame. In some other aspects, the values of the relay flow suspended field 585 may be reversed when compared to the examples provided above.

FIG. 6A shows one embodiment of a block acknowledgement target wake time (BAT) media access control header 600a. The BAT media access control header 600a includes ten (10) different fields, a frame control field 605a, a duration field 610a, a receiver address field 615a, a transmitter address 620a, a beacon sequence field 625a, a partial timestamp field 630a, a next target wake time field 635, a starting sequence number field 636a, a BAT information field 638a, and a frame check sequence field 640a. In some aspects, frame control field 605a may conform with the frame control format 305a, discussed with respect to FIG. 4A. The protocol version field 405a of the frame 600a may be set to zero in some aspects. In these aspects, the frame control field 605a may conform with the frame control format 305a illustrated in FIG. 4A. These aspects include a type field 410a that is two bits long and a subtype field 415a that is four bits long. In these aspects the two bits of the type field may be set to 11 and the subtype fields may identify the different subtypes of control response frames described herein. For example, one value of the subtype field 410a may identify frame 600a as a block acknowledgement target wake time (BAT) frame.

The starting sequence number field 636a contains the sequence number of the first MSDU for which this BAT frame 600 is sent. The BAT information field 638a contains two subfields, a BAT traffic identifier (TID) field 638aa and a BAT Bitmap field 638ab. The BAT TID field 638aa contains the TID for which this BAT frame is sent. The BAT Bitmap field 638ab indicates a received status of up to 12 MSDUs and A-MSDUs. Each bit that is equal to one (1) in the BAT Bitmap field 638ab acknowledges the successful reception of a single MSDU or AMSDU in sequentially increasing sequence number order, with the first bit of the BAT Bitmap field 538ab corresponding to the MSDU or A-MSDU with the sequence number that matches the value of the Starting Sequence Number field 636a of the block acknowledgement target wake time (BAT) media access control header 600a.

FIG. 6B shows one embodiment of a block acknowledgement target wake time (BAT) media access control header 600b. The BAT media access control header includes nine (9) different fields, a frame control field 605b, a receiver address or A1 field 615b, a transmitter address or A2 field 620b, a beacon sequence field 625b, a partial timestamp field 630b, a next target wake time field 635b, a starting sequence control field 637b, a BAT bitmap field 639b, and a frame check sequence field 640b. In some aspects, the frame control field 605b may conform with the frame control format 605b, discussed in more detail below with respect to FIG. 6C.

In some aspects, the A1 field 615b is a service identifier (SID) field that contains the association identifier (AID) of the intended recipient of the frame. In these aspects, the A1 field 615b may be only two bytes long. In some aspects, the A2 field 620b contains the MAC address of the transmitter sending the frame 600b. The beacon sequence field 625b contains the value of the Change Sequence Field from the most recently transmitted beacon. The partial timestamp field 630b contains the least significant five octets of the value of the transmitting device's time synchronization function (TSF) timer at the time that the data symbol containing the first bit of the partial timestamp is transmitted by the PHY, including the transmitting device's delays through its local PHY from the MAC-PHY interface to its interface with the WM.

If the next TWT present field 675 is set in the frame control field 605b (discussed below), the Next Target Wake Time field 635b contains the next target wake time value for the intended recipient of the frame 600b given as the lowest six bytes of the TSF time for the next TWT. Otherwise, the Next TWT field 635b is reserved and/or unused.

Block acknowledgement target wake time (BAT) media access control header 600b differs from frame 600a in at least that the starting sequence number field 636a has been replaced with a starting sequence control field 637b. The starting sequence control field 637b includes two fields, a starting sequence number field 637ba and a BAT TID field 637bb. The starting sequence number field 637ba contains the sequence number of the first MSDU for which this BAT frame 600b is sent. In some aspects, the starting sequence number 637ba carries substantially equivalent information as the starting sequence number field 636a of frame 600a. Note that the starting sequence number field 637ba of frame 600b is 12 bits in length while the starting sequence number field 636a of frame 600a is 16 bits in length. The BAT TID field 637bb contains the TID for which this BAT frame is sent. In some aspects, the BAT TID field 637bb carries substantially equivalent information as the BAT TID field 638aa of frame 600a. Note that while FIG. 6B shows the starting sequence number field 637ba preceding the BAT TID field 637bb in frame 600b, in some aspects, the order of the starting sequence number field 637ba and BAT TID field 637bb may be reversed from that shown in FIG. 6B.

The BAT Bitmap field 639b indicates a received status of up to 32 MSDUs and A-MSDUs (one per bit). Each bit that is equal to one (1) in the BAT Bitmap field 639b acknowledges the successful reception of a single MSDU or AMSDU in sequentially increasing sequence number order, with the first bit of the BAT Bitmap field 639b corresponding to the mac service data unit (MSDU) or aggregate mac service data unit (A-MSDU) with the sequence number that matches the value of the Starting Sequence Number field 637ba of the block acknowledgement target wake time (BAT) media access control header 600b.

FIG. 6C shows an example format for the frame control field 605b. The frame control field 605b includes a total of nine (9) different fields: a protocol version field 650, a type field 655, a subtype field 660, a bandwidth indication field 665, a dynamic indication field 670, a next target wake time present field 675, a more data field 680, a flow suspended field 685, and a reserved field 690. In some aspects, the flow suspended field 685 may be referred to as a flow control field.

Protocol version field 650 of frame control field 605b may be set to one (0x01). The frame control field 605b of FIG. 6C differs from the example frame control field 305b discussed above. While frame control field 305b included the two bit reserved field 445b, frame control field 605b allocates those two bits to the flow suspended field 685 and the reserved field 690. In some aspects, the type field 655 may be two bits in length (instead of the three (3) bits illustrated), and the subtype field 660 may be four bits in length (instead of the two (3) bits illustrated).

In some aspects, the relay flow suspended field 685 indicates that a device transmitting a response frame that includes this frame control field 605b is requesting the recipient of the frame to suspend its data transmission to it for the duration of time indicated by the next TWT field 635. In other words, the relay flow suspended field 685 indicates whether a transmitter of the control frame including frame control field 605b will be able to receive any data for a time period indicated in the next TWT field after the transmission of the control frame. In some aspects, transmission of a response frame with frame control field 605b with the relay flow suspended field 685 set, for example to 1, performs a function substantially similar to a relay flow suspend action frame. In some aspects, the transmission of a response frame with a frame control field 605b with the relay flow suspended field 685 clear performs a function substantially similar to a relay flow resume action frame. In one embodiment a frame that has this functionality of the relay flow resume may be a RTS or a CTS frame. In some other aspects, the values of the relay flow suspended field 685 may be reversed when compared to the examples provided above.

Figure 6D:
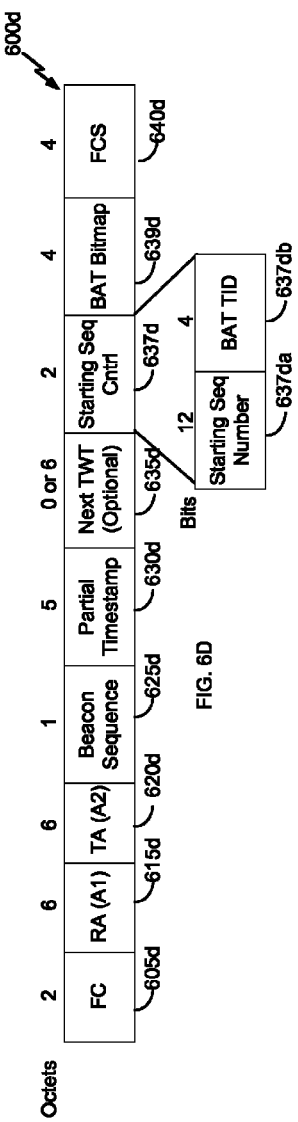
FIG. 6D shows one embodiment of a block acknowledgement target wake time (BAT) media access control header.

FIG. 6D shows another embodiment of a block acknowledgement target wake time (BAT) media access control header 600d. The BAT media access control header includes ten (10) different fields, a frame control field 605d, a receiver address field 615d, a transmitter address 620d, a beacon sequence field 625d, a partial timestamp field 630d, a next target wake time field 635d, a starting sequence control field 637*d*, a BAT bitmap field 639*d*, and a frame check sequence field 640*d*. In some aspects, the frame control field 605*d* may conform to the frame control format 605*b*, discussed with respect to FIG. 6C above.

Block acknowledgement target wake time (BAT) media access control header 600*d* differs from frame 600*a* in at least that the starting sequence number field 636*a* has been replaced with a starting sequence control field 637*d*. The starting sequence control field 637*d* includes two fields, a starting sequence number field 637*da* and a BAT TID field 637*db*. The starting sequence number field 637*da* contains the sequence number of the first MSDU for which this BAT frame 600*d* is sent. In some aspects, the starting sequence number 637*da* carries substantially equivalent information as the starting sequence number field 636*a* of frame 600*a*. Note that the starting sequence number field 637*da* of frame 600*d* is 12 bits in length while the starting sequence number field 636*a* of frame 600*a* is 16 bits in length. The BAT TID field 637*db* contains the traffic identifier (TID) for which this BAT frame is sent. In some aspects, the BAT TID field 637*db* carries substantially equivalent information as the BAT TID field 638*aa* of frame 600*a*.

The BAT Bitmap field 639*d* indicates a received status of up to 32 MSDUs and A-MSDUs. Each bit that is equal to one (1) in the BAT Bitmap field 639*d* acknowledges the successful reception of a single MSDU or AMSDU in sequentially increasing sequence number order, with the first bit of the BAT Bitmap field 639*d* corresponding to the MSDU or A-MSDU with the sequence number that matches the value of the Starting Sequence Number field 637*da* of the block acknowledgement target wake time (BAT) media access control header 600*d*.

Figure 7A:
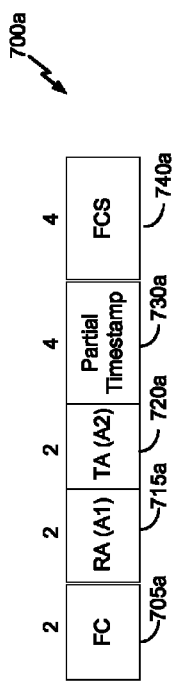
FIG. 7A shows one embodiment of a short target wake time acknowledgement (STACK) media access control header.

FIG. 7A shows one embodiment of a short target wake time acknowledgement (STACK) media access control header 700*a*. The STACK media access control header includes five (5) different fields, a frame control field 705*a*, a receiver address field 715*a*, a transmitter address 720*a*, a partial timestamp field 730*a*, and a frame check sequence field 740*a*. In some aspects, the A1 field 715*a* may indicate the AID of the intended recipient of the frame. In some aspects, the A2 field 720*a* is an SID field that contains the bit sequence Scrambler Initialization[0:6]||FCS[23:31] ("||" is concatenation) obtained from the Scrambler Initialization value in the Service field, prior to descrambling, and the FCS field of the physical layer service data unit (PSDU) that carries the soliciting frame.

In some aspects, the frame control field 705*a* may conform to frame control format 305*a*, discussed above with respect to FIG. 4A. In some aspects, the protocol version field 705*a* of frame control field 305*a* may be set to zero (0). In these aspects, the frame control field 705*a* may conform with the frame control format 305*a* illustrated in FIG. 4A. These aspects include a type field 410*a* that is two bits long and a subtype field 415*a* that is four bits long. In these aspects, two bits of the type field may be set to 11 and the subtype fields may identify the different subtypes of control response frames described herein. For example, one value of the subtype field 410*a* may identify frame 700*a* as a short target wake time acknowledgement (STACK) frame.

In some other aspects, the frame control field 705*a* may conform to frame control format 705*b*, discussed below with respect to FIG. 7C. In these aspects, the protocol version field 750 may be set to one (0x01). In these aspects, the type field may be three (3) or four (4) bytes long, and the subtype field may be two (2) or three (3) bytes long. In these aspects, a subtype field with a value of zero (0) may indicate a STACK frame.

Figure 7B:
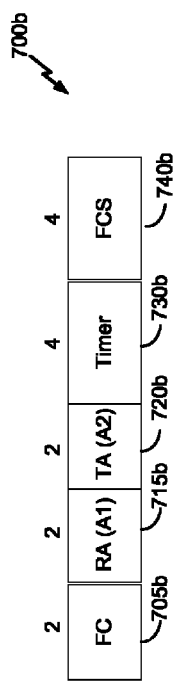
FIG. 7B shows one embodiment of a short target wake time acknowledgement (STACK) media access control header.

FIG. 7B shows one embodiment of a short target wake time acknowledgement (STACK) media access control header 700*b*. The STACK media access control header 700*b* includes five (5) different fields, a frame control field 705*b*, a receiver address field 715*b*, a transmitter address 720*b*, a timer field 730*b*, and a frame check sequence field 740*b*. In some aspects, the frame control field 705*b* may conform to frame control format 705*b*, discussed below with respect to FIG. 7C. STACK frame 700*b* functions similarly to STACK frame 700*a*, except the bits comprising the partial timestamp field 730*a* have been redefined as a timer field 730*b*. The timer field may also be known as a Partial Timestamp/Next TWT/Suspend Duration field in some aspects. The timer field 730*b* may indicate either a duration until the next target wake time or a partial timestamp. If so indicated, the differentiation between the two indications may be based on the next TWT present field 775 of frame control field 705*b*, discussed below with respect to FIG. 7C.

Figure 7C:
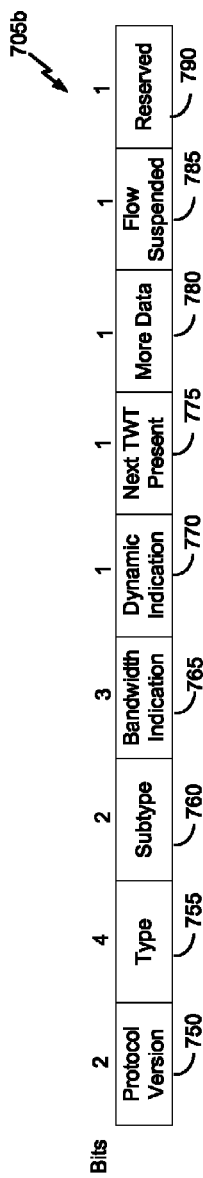
FIG. 7C shows an example format for the frame control field.

FIG. 7C shows an example format for the frame control field 705*b*. The frame control field 705*b* includes a total of nine (9) different fields: a protocol version field 750, a type field 755, a subtype field 760, a bandwidth indication field 765, a dynamic indication field 770, a next TWT present field 775, a more data field 780, a flow suspended field 785, and a reserved field 790. In some aspects, the type field 755 may be three (3) bits in length, instead of the four (4) bits shown, and the subtype field 760 may be three bits in length, instead of the two (2) bits shown. Regardless of the length of the individual type and subtype fields, the total length of the type and subtype fields combined is six (6) bits in the disclosed implementations. In some aspects, the flow suspended field 785 may be referred to as a flow control field. The reserved field may be used for example to indicate that the control response frame information is protected.

Protocol version field 750 of frame control field 705*b* is set to one (0x01). The frame control field 705*b* of FIG. 7C differs from the example frame control field 305*b* discussed above. While frame control field 305*b* included the two bit reserved field 445*b*, frame control field 705*b* allocates those two bits to the flow suspended field 785 and the reserved field 790. In some aspects, the flow suspended field 785 indicates that a device transmitting a response frame that includes this frame control field 705*b* is requesting the recipient of the frame to suspend its data transmission to it for the duration of time indicated by the next TWT field located in the Timer field 730*b*. In other words, the flow suspended field 785 indicates whether a transmitter of the control frame including frame control field 705*b* will be able to receive any data for a time period indicated in the next TWT field after the transmission of the control frame. In some aspects, transmission of a response frame with frame control field 705*b* with the flow suspended field 785 set, for example to 1, performs a function substantially similar to a relay flow suspend action frame. In some aspects, the transmission of a response frame with a frame control field 705*b* with the flow suspended field 785 clear performs a function substantially similar to a relay flow resume action frame. In one embodiment a frame that has this functionality of the relay flow resume may be a RTS or a CTS frame. In some other aspects, the values of the flow suspended field 785 may be reversed when compared to the examples provided above.

As discussed above, the next TWT present field 775 may indicate whether the bits positioned within MAC frame 700*a* and/or 700*b* at the location of the partial timestamp field 730*a* or the timer field 730*b* should be interpreted as a partial timestamp or a time field indicating a duration to the next target wake time. A partial timestamp may represent the least significant four octets of a value of the transmitting STA's TSF timer at the time that data symbol containing the first bit of the partial timestamp is transmitted by the PHY. The partial timestamp may include delays from the transmitting STA's through its local PHY from the MAC-PHY interface to its interface with the wireless media.

In some aspects, the relay flow suspended field 785 indicates that a device transmitting a response frame that includes this frame control field 705*b* is requesting the recipient of the frame to suspend its data transmission to it for the duration of time indicated by the next TWT field 775. In other words, the relay flow suspended field 785 indicates whether a transmitter of the frame including frame control field 705*b* will be able to receive any data for a time period indicated in the next TWT field after the transmission of the frame. In some aspects, transmission of a response frame with frame control field 705*b* with the relay flow suspended field 785 set, for example to 1, performs a function substantially similar to a relay flow suspend action frame. In some aspects, the transmission of a response frame with a frame control field 705*b* with the relay flow suspended field 785 clear performs a function substantially similar to a relay flow resume action frame. In one embodiment a frame that has this functionality of the relay flow resume may be a RTS or a CTS frame. In some other aspects, the values of the relay flow suspended field 785 may be reversed when compared to the examples provided above.

If the STACK frame 700*b* is transmitted with frame control field 705*b* indicating the timer field is present, this enables a STACK frame to indicate a next target wake time, which is an advantage over known frame formats. The next target wake time indicated by the timer field 730 may indicate the next TWT value for the intended recipient of the frame given as the lowest four bytes of the TSF time for the next TWT.

In some aspects, if the next TWT present field 775 is set to zero, the timer field 730*b* is interpreted as a partial timestamp field 730*a*. In these aspects, if the next TWT present field 775 is set to one, the timer field 730*b* is interpreted as a duration to the next target wake time. In some other aspects, these values of the next TWT present field 775 are reversed.

One advantage of providing an indication of whether the MAC frame includes a partial timestamp field or a duration to the next target wake time, as provided by the next TWT present field 775, is that the length of the media access control frame 700*a* and 700*b*, for example, is the same regardless of what information is provided. This contrasts with other methods which may result in a variable length media access control header, with the length depending on the type of information provided.

By ensuring the media access control header is the same length, an ability of a wireless device to understand in advance how much time it should defer before transmitting and/or listening on the wireless network is improved. This may result in an increased ability for the wireless device to enter a lower power state. Additionally, this may result in some aspects in more reliable reception of wireless transmissions. For example, because the length of the media access control headers are more predictable given their constant length, deferral methods used by wireless devices may be more able to reduce collisions between their own transmissions and transmissions of the media access control headers (and their associated data) from other devices.

Figure 8A:
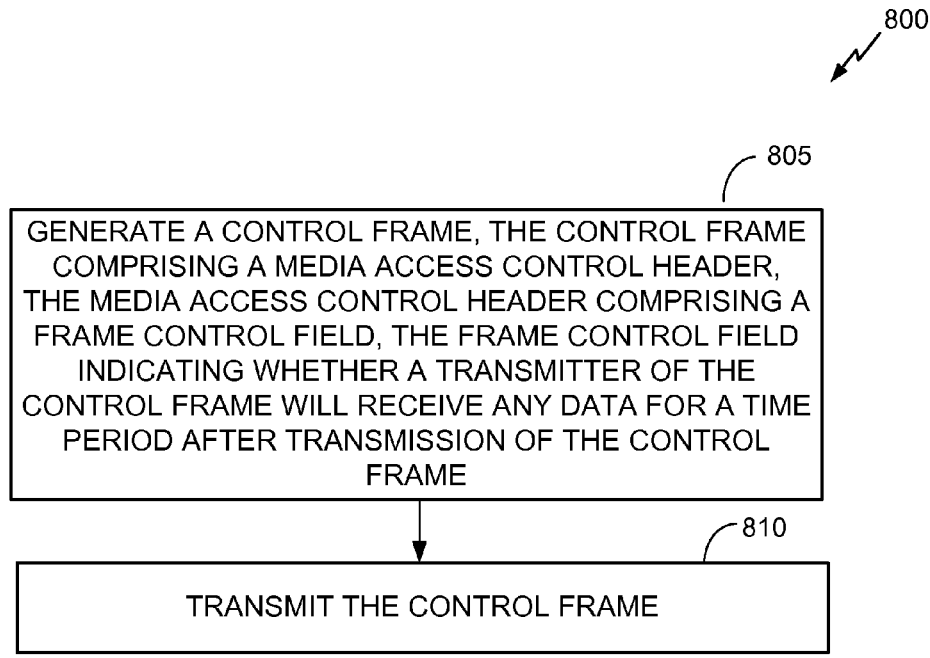
FIG. 8A illustrates an aspect of a method for transmitting a control frame.

FIG. 8A illustrates an aspect of a method 800 for transmitting a control frame. The method 800 may be used to selectively generate any of the frames discussed herein. The frame may be generated at either the AP 104 or the STA 106 and transmitted to another node in the wireless network 100. Although the method 800 is described below with respect to elements of the wireless device 202, those having ordinary skill in the art will appreciate that other components may be used to implement one or more of the steps described herein.

At block 805, a control frame is generated. The control frame includes a media access control header. The media access control header includes a frame control field. The frame control field includes a packet version field. The packet version field is set to a value of one (0x01). In some aspects, the frame control field includes a type field that is three or four bits in length. In some aspects, the frame control field includes a subtype field that is two or three bits in length. In the disclosed implementations, the total length of the type and subtype fields combined is six (6) bits, regardless of the length of the individual fields. In some aspects, the frame control field indicates whether a transmitter of the control frame will receive any data for a time period after transmission of the control frame. In some of these aspects, the time period is indicated by a time reference included in the media access control header.

In some aspects, the control frame is one of a short beacon, probe response, RA frame, target wake time acknowledgement (TACK), a block acknowledgement target wake time (BAT), and a short target wake time acknowledgement (STACK) frame. In some aspects where the control frame is a block acknowledgement target wake time frame, the control frame indicates a receive status of up to 32 MSDUs and A-MSDUs. In some aspects where the control frame is a short target wake time acknowledgement, the control frame indicates a next target wake time. In some aspects, whether the next target wake time is indicated is based on a next target wake time present field in the frame control field. In some of these aspects, if the next target wake time is present, it is included in the media access control header.

In block 804, the frame is wirelessly transmitted. The transmission may be performed by the transmitter 210 and/or the processor 204, for example.

Figure 8B:
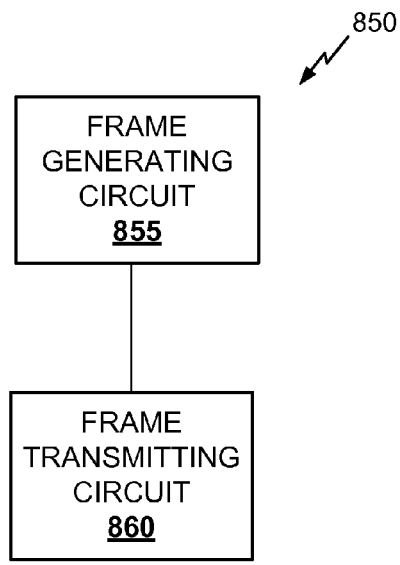
FIG. 8B is a functional block diagram of an exemplary wireless device that may be employed within a wireless communication system.

FIG. 8B is a functional block diagram of an exemplary wireless device 850 that may be employed within the wireless communication system 100. The device 850 comprises a frame generating circuit 855 for generating the frame. The frame generating circuit 855 may be configured to perform one or more of the functions discussed above with respect to the block 805 illustrated in FIG. 8A. The frame generating circuit 805 may correspond to one or more of the processor 204 and/or the DSP 220. The device 850 further comprises a frame transmitting circuit 810 for wirelessly transmitting the generated frame. The frame transmitting circuit 860 may be configured to perform one or more of the functions discussed above with respect to the block 810 illustrated in FIG. 8A. The frame transmitting circuit 860 may correspond to the transmitter 210 and/or the processor 204.

Figure 9A:
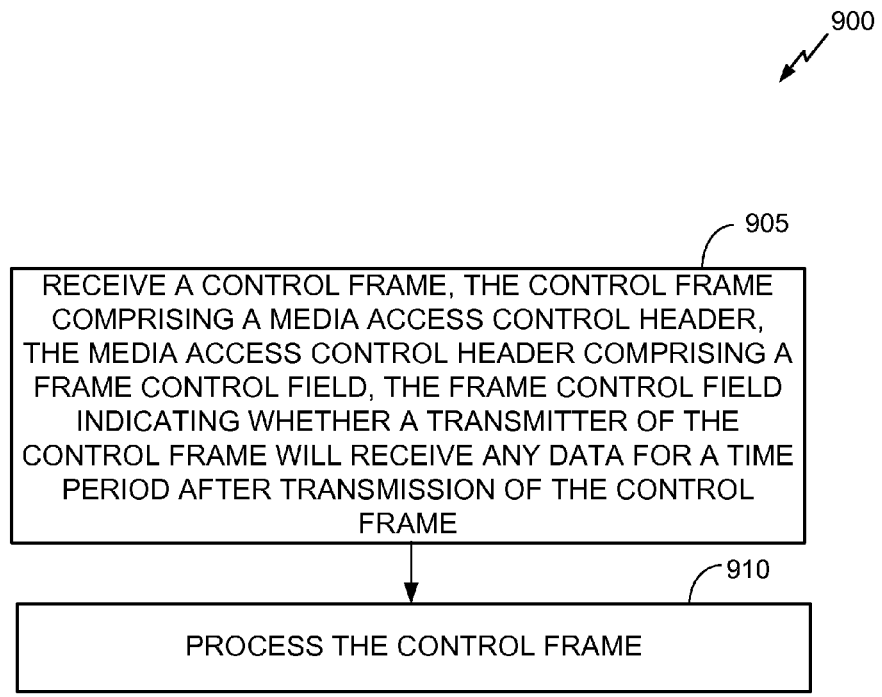
FIG. 9A illustrates an aspect of a method for receiving a control frame.

FIG. 9A illustrates an aspect of a method 900 for receiving a control frame. The method 900 may be used to selectively receive any of the frames discussed herein. The frame may be received at either the AP 104 or the STA 106. Although the method 900 is described below with respect to elements of the wireless device 202, those having ordinary skill in the art will appreciate that other components may be used to implement one or more of the steps described herein.

At block 905, a control frame is received. The control frame includes a media access control header. The media access control header includes a frame control field. The frame control field indicates whether a transmitter of the control frame will receive any data for a time period after transmission of the control frame. In some aspects, the time period is indicated by a time reference included in the media access control header.

In some aspects, the frame control field includes a type field that is three or four bits in length. In some aspects, the frame control field includes a subtype field that is two or three bits in length. In the disclosed implementations, the total length of the type and subtype fields combined is six (6) bits, regardless of the length of the individual fields. In some aspects, the control frame is one of a short beacon, probe response, RA frame, target wake time acknowledgement (TACK), a block acknowledgement target wake time (BAT), and a short target wake time acknowledgement (STACK) frame. In some aspects where the control frame is a block acknowledgement target wake time frame, the control frame indicates a receive status of up to 32 MSDUs and A-MSDUs. In some aspects where the control frame is a short target wake time acknowledgement, the control frame indicates a next target wake time. In some aspects, whether the next target wake time is indicated is based on a next target wake time present field in the frame control field. In some of these aspects, if the next target wake time is present, it is included in the media access control header.

In block 910, the control frame is processed. For example, in some aspects, a device receiving the control frame of block 905 may decode the control frame to determine whether the transmitter of the control frame (the transmitting device) will receive any data for a time period after transmission/reception of the control frame. The receiving device may then determine whether to transmit data to the transmitting device during the time period based on the decoding. For example, if the transmitting device indicated it will not receive any data, then a device performing process 900 may defer transmission and/or otherwise queue data that otherwise is ready to send to the transmitting device. If the transmitting device indicated it can receive data during the time period, then that same data may be transmitted to the transmitting device during the time period. The processing of the frame may be performed by the processor 204, for example.

Figure 9B:
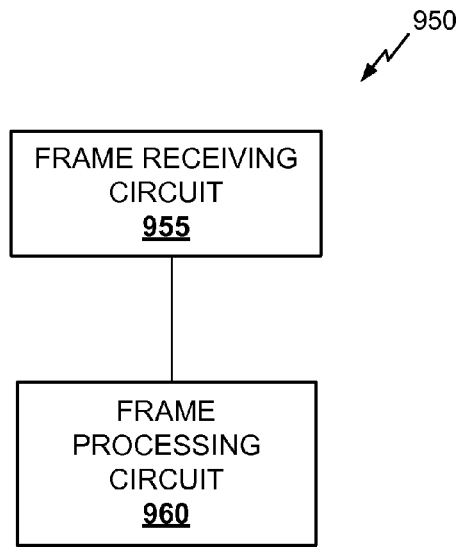
FIG. 9B is a functional block diagram of an exemplary wireless device that may be employed within a wireless communication system.

FIG. 9B is a functional block diagram of an exemplary wireless device 950 that may be employed within the wireless communication system 100. The device 950 comprises a frame receiving circuit 955 for receiving the frame. The receiving circuit 955 may be configured to perform one or more of the functions discussed above with respect to the block 905 illustrated in FIG. 9A. The frame receiving circuit 955 may correspond to one or more of the receiver 212 and/or the processor 204 and/or the DSP 220. The device 950 further comprises a frame processing circuit 910 for processing the received frame. The processing circuit 960 may be configured to perform one or more of the functions discussed above with respect to the block 910 illustrated in FIG. 9A. The processing circuit 960 may correspond to the processor 204.

Figures 10, 11A, 11B:
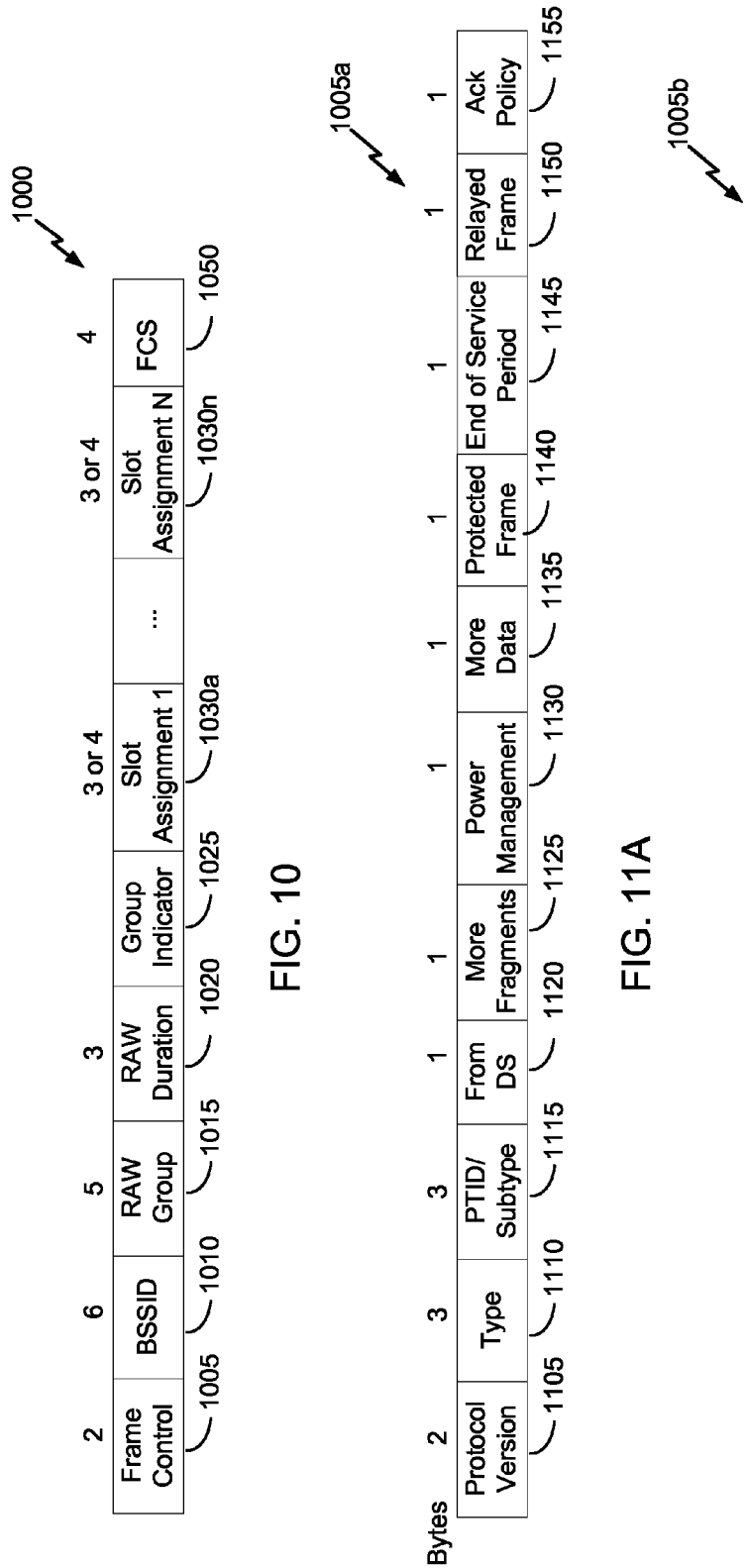
FIG. 10 shows an example format of a resource allocation frame.
FIG. 11A shows an example format of a frame control field.
FIG. 11B shows an example frame control field that includes a group indicator field.

FIG. 10 shows an example format of a resource allocation frame 1000. A resource allocation frame may be broadcast to one or more stations within a restricted access window group to indicate the presence of downlink buffered data for paged stations and their assigned time slots for both uplink and downlink service periods. The resource allocation frame 1000 includes a frame control field 1005, a basic service set identifier field 1010, a restricted access window group field 1015, a restricted access window duration field 1020, a group indicator field 1025, one or more slot assignment fields 1030a-"n", and a frame check sequence field 1050.

FIG. 11A shows an example format of a frame control field 1005a. In some aspects, the frame control field 1005 of FIG. 10 may conform to the format of frame control field 1005a. The frame control field 1005a includes a protocol version field 1105, a type field 1110, a PTID/subtype field 1115, a from DS field 1120, a more fragments field 1125, a power management field 1130, a more data field 1135, a protected frame field 1140, an end of service period field 1145, a relayed frame field 1150, and an ack policy field 1155. When the frame control field 1005a is used in a resource allocation frame such as resource allocation frame 1000, the type field may have a value of one and the subtype field may have a value of three.

In some aspects of the frame control field 1005a, the protocol version field 1105 may be set to one (1). In these aspects, one or more of the from DS field 1120, more fragments field 1125, power management field 1130, a more data field 1135, protected frame field 1140, end of service period field 1145, relayed frame field 1150, or the ack policy field 1155 may be used for other purposes. For example, the group indicator field 1025 of the resource allocation frame 1000 may be moved to the frame control field 1005.

FIG. 11B shows an example frame control field 1005b that includes a group indicator field 1175. The frame control field 1005b also includes a protocol version field 1160, type field 1165, and a ptid/subtype field 1170. In some aspects, the frame control field 1005 of FIG. 10 conforms at least substantially with the format of the frame control field 1005b. In some aspects, a resource allocation frame may utilize the frame control field format 1005b. In some of these aspects, the type field 1165 may be set to or have a value of one (1) while the subtype field may be set to or have a value of three (3).

FIG. 12 shows an example format of a short probe response frame 1200. The short probe response frame includes a frame control field 1205, destination address field 1210, source address field 1215, timestamp field 1220, change sequence field 1225, next target beacon transit time field 1230, a compressed SSID field 1235, access network options field 1240, zero or more information elements 1245 and a frame check sequence field 1250.

FIG. 13A shows an example of a portion of a frame control field 1205a. In some aspects, the frame control field 1205 of short probe response frame 1200 may conform to the format of the frame control field 1205a. The frame control field 1205a includes a protocol version field 1305, a two bit type field 1310, and a four bit subtype field 1315. In some aspects, the protocol version field 1305 may be set to a value of zero (0), the type field 1310 may be set to a value of 3, and the subtype field 1315 may be set to a value of ANA (any number).

FIG. 13B shows an example of a portion of a frame control field 1205b. In some aspects, the frame control field 1205 of short probe response frame 1200 may conform to the format of the frame control field 1205b. The frame control field 1205b includes a protocol version field 1355, a three bit type field 1360, and a three bit subtype field 1365. In some aspects, the protocol version field 1360 may be set to a value of 1, the type field 1365 may be set to a value of 1, and the subtype field 1370 may be set to a value of 2.

Figures 14A, 14B:
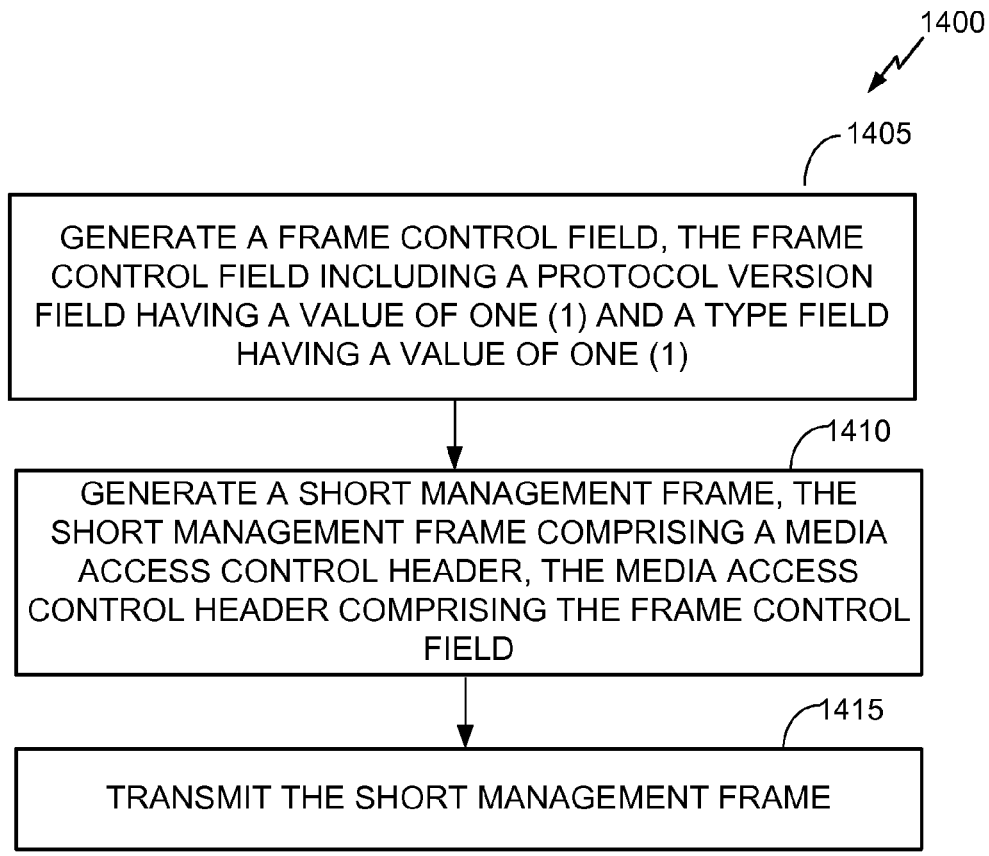
FIG. 14A illustrates an aspect of a method for transmitting a short management frame.
FIG. 14B is a functional block diagram of an exemplary wireless device that may be employed within a wireless communication system.

FIG. 14A illustrates an aspect of a method 1400 for transmitting a short management frame. The short management frame may be generated at either the AP 104 or the STA 106 and transmitted to another node in the wireless network 100. Although the method 1400 is described below with respect to elements of the wireless device 202, those having ordinary skill in the art will appreciate that other components may be used to implement one or more of the steps described herein.

At block 1405, a frame control field is generated. The frame control field includes a protocol version field having a value of one (1) and a type field having a value of one. In some aspects, the type field is three bits in length. In other aspects, the type field is four bits in length.

In block 1410, a short management frame is generated. The short management frame includes a media access control header. The media access control header includes the frame control field generated in block 1405. In some aspects, the frame control field is generated to include a subtype field. The subtype field may be generated to be either two (2) or three (3) bits in length. In the disclosed implementations, the total length of the type and subtype fields combined is six (6) bits, regardless of the length of the individual fields. If the short management frame is a resource allocation frame, the subtype field is generated to have a value of three (3). If the short management frame is a short probe response frame, the subtype field is generated to have a value of two (2).

In block 1415, the short management frame is transmitted. The transmission may be performed by the transmitter 210, and/or the processor 204.

FIG. 14B is a functional block diagram of an exemplary wireless device 1450 that may be employed within the wireless communication system 100. The device 1450 comprises a frame control field generation circuit 1455. The frame control field generation circuit 1455 may be configured to perform one or more of the functions discussed above with respect to block 1405. In some aspects, the frame control field generation circuit 1455 corresponds to the processor 204. The device 1450 further comprises a short management frame generating circuit 1460. The short management frame generating circuit 1460 may be configured to perform one or more of the functions discussed above with respect to the block 1410 illustrated in FIG. 14A. The short management frame generating circuit 1410 may correspond to one or more of the processor 204 and/or the DSP 220. The device 1450 further comprises a frame transmitting circuit 1465 for wirelessly transmitting the generated frame. The frame transmitting circuit 1465 may be configured to perform one or more of the functions discussed above with respect to the block 1415 illustrated in FIG. 14A. The frame transmitting circuit 1465 may correspond to the transmitter 210 and/or the processor 204.

Figure 15A:
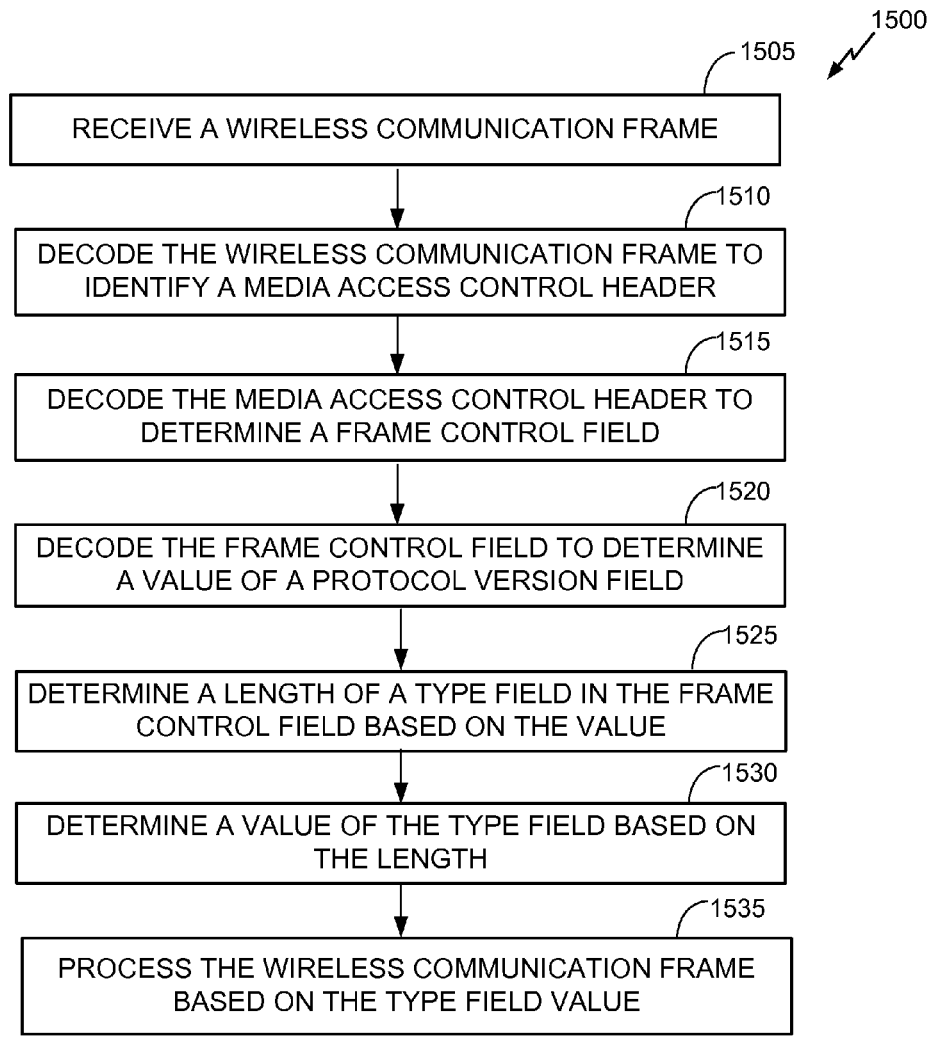
FIG. 15A illustrates an aspect of a method for receiving a wireless communication frame.

FIG. 15A illustrates an aspect of a method 1500 for receiving a wireless communication frame. The method 1500 may be used to selectively receive at least some of the frames discussed herein. The frame may be received at either the AP 104 or the STA 106. Although the method 1500 is described below with respect to elements of the wireless device 202, those having ordinary skill in the art will appreciate that other components may be used to implement one or more of the blocks described below.

At block 1505, a wireless communication frame is received. In block 1510, the wireless communication frame is decoded to identify a media access control header. The identified media access control header is decoded in block 1515 to identify a frame control field. In block 1520, the frame control field is decoded to determine a value of a protocol version field.

In block 1525, a length of a type field is determined based on the value of the protocol version field. For example, in some aspects, if the protocol version field has a first value, the length of the type field will be a first length. If the protocol version field has a second value, the length of the type field will be determined to be a second length. As discussed above, for example, the frame control field 305*a* includes a protocol version field 405*a* that is set to a value of one. The length of the type field 410*a* is 2 bits and the length of the subtype field 415*a* is four bits. In contrast, the protocol version field 405*b* of frame control field 305*b* may be set to one. The length of the type field 410*b* may be three or four bits, in contrast to the two bit length of type field 410*a*. The length of the subtype field 415*b* is two bits or three bits, in contrast to the four bit length of subtype field 415. Therefore, the value of the protocol version 405*a* and/or 405*b* may be used to determine a length of the type field 410*a/b* and subtype field 415*a/b*. This may also be the case for other frame formats disclosed herein. For example, frame control field 505 of FIG. 5B has a protocol version field 550 that is set to one, while its corresponding type field 555 and subtype field 560 have lengths of four bits and two bits respectively. These lengths also differ from the type and subtype fields 410*a* and 415*a* associated with protocol version field 405*a*, which is set to zero. This may also be true for frame control field 705*b* of FIG. 7C (protocol version field 750 and corresponding type and subtype fields 755 and 760), frame control field 1005*a* of FIG. 11A (protocol version field 1105 and corresponding type and subtype fields 1110 and 1115), frame control field 1005*b* of FIG. 11B (protocol version field 1160 and corresponding type field 1165 and PTID/subtype field 1170), frame control field 1205*a* of FIG. 13A (protocol version field 1305, which is typically set to zero, and corresponding type field 1310 and subtype field 1315, with lengths of 2/4 respectively), contrast with frame control field 1205*b* of FIG. 13B, with protocol version field 1360, set to one, with type field 1365 and subtype field 1370, with lengths of 3/3 respectively or 4/2 respectively.

In block 1530, a value of the type field is determined based on the length determined in block 1525. For example, if the wireless communications frame received in block 1505 includes the frame control field 1205*b*, the value of the type field may be determined based on three bits following the protocol version field 1360 or in another aspect, four bits following the protocol version field 1360 (corresponding to the length of type field 1365). In contrast, if the wireless communications frame received in block 1505 includes the frame control field 1205*a* (with a protocol version of zero (0) in protocol version field 1305), a value of the type field may be determined based on only the two bits following the protocol version field 1305 (the two bits corresponding to the length of type field 1310).

Some aspects of method 1500 include determining a length of a subtype field in the frame control field based on the protocol version field value or based on the length of the type field. In some aspects, if the protocol version field value is equal to a first value, the length of the type field will be determined to be greater than a determined length of the subtype field. In some of these aspects, if the protocol version field is a second value, the length of the type field will be determined to be greater than or equal to the length of the subtype field.

In some aspects, when the protocol version field is equal to one, each of a type and subtype field in the frame control field are determined to be three bits in length. In some other aspects, when the protocol version field is equal to one, the type field is determined to be four bits in length and the subtype field is determined to be two bits in length.

In some aspects, if the protocol version field value is a first value, and the type field is a second value, the received wireless frame is a "short" management frame, such as the resource allocation frame 1000 or the short probe response frame 1200. For example, in some aspects, a protocol version value of one (1) and a type value of one (1) indicates the wireless frame is a short management frame.

In some aspects, the frame control field is further decoded to determine a value of the subtype field. In some aspects, if the subtype field is determined to equal a particular value, the wireless communication frame is determined to be a resource allocation frame, such as resource allocation frame 1000 of FIG. 10. In some aspects, the particular value for a resource allocation frame is three (3). In some aspects, if the frame is determined to be a resource allocation frame, the frame control field is further decoded to determine a value of a group indication field. In these aspects, the media access control header may not include a group indication field. The group indication field may indicate a group of devices to which the resource allocation frame applies.

In some aspects, if the subtype field is determined to equal a second particular value, the wireless communication frame is a "short" probe response frame, such as frame 1200. For example, in some aspects, if the subtype field is equal to two (2), the wireless communication frame is a "short" probe response frame.

In block 1535, the wireless communication frame is processed based on the type field value. For example, processing a frame based on the type value may include decoding the frame to contain a particular organization of fields, with corresponding associated values, based on the type value. As discussed above, a variety of frame formats may be received as the wireless communication frame of block 1505. To successfully process the received frame, a receiving device may determine which fields the communication frame contains, and their location or offset and length within the frame. This format may be determined by a device receiving the frame, such as a device performing process 1500, in some aspects based at least in part, on the type value.

For example, processing the wireless communication frame as a short management frame may include decoding the subtype field as described above to determine if the frame is a resource allocation frame or a short probe response frame. A resource allocation frame may be processed differently than a short probe response frame versus other types of non-management frame types. For example, in some aspects, a resource allocation frame includes a group indicator field. If process 1500/block 1535 determines that the received wireless communication frame is a resource allocation frame, it may decode the resource allocation frame to determine a value for the group indicator field in the frame control field. If the received wireless frame is determined to not be a resource allocation frame, and, for example, is instead determined to be a short probe response frame, then block 1535 may not decode the received frame to determine a group indication field, since the short probe response frame may not include such a field in its frame control field.

As discussed above, use of the protocol version field to distinguish between the format of various frames (such as frames having a different length for their respective type/subtype fields) may provide for an improved ability to define additional frame types. Known frame formats utilize a frame type field that is only two bits in length, thus providing four possible frame types. These four frame types have been exhausted, preventing the definition of additional frame types. By providing new frame formats with frame type fields of three or four bits, eight or even perhaps sixteen frame types may be defined. This provides more flexibility and extensibility when compared to existing frame formats.

Figure 15B:
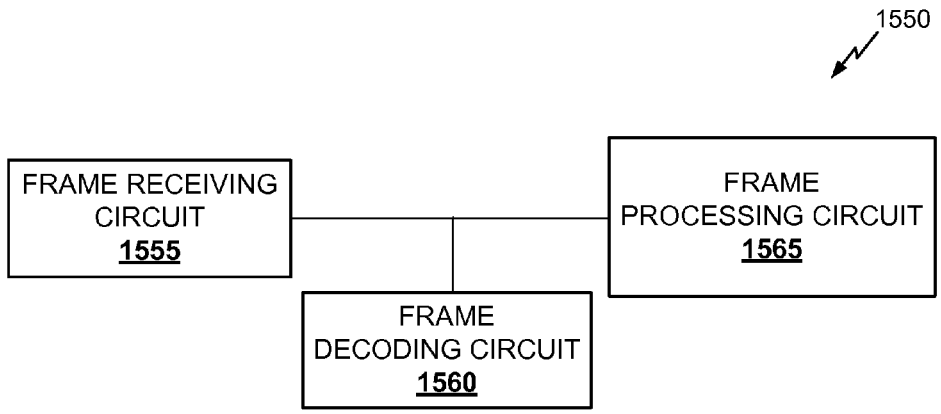
FIG. 15B is a functional block diagram of an exemplary wireless device that may be employed within a wireless communication system.

FIG. 15B is a functional block diagram of an exemplary wireless device 1550 that may be employed within the wireless communication system 100. The device 1550 comprises a frame receiving circuit 1555 for receiving the frame. The frame receiving circuit 1555 may be configured to perform one or more of the functions discussed above with respect to the block 1505 illustrated in FIG. 15A. The frame receiving circuit 1555 may correspond to one or more of the processor 204 and/or the receiver 212. The device 1550 further comprises a frame decoding circuit 1560 for decoding the received frame. The frame decoding circuit 1560 may be configured to perform one or more of the functions discussed above with respect to the blocks 1510-1530 illustrated in FIG. 15A. The frame decoding circuit 1560 may correspond to the processor 204 and/or the DSP 220. The device 1550 further comprises a frame processing circuit 1565 for processing the received frame. The frame processing circuit 1565 may be configured to perform one or more of the functions discussed above with respect to the block 1535 illustrated in FIG. 15A. The frame processing circuit 1565 may correspond to the processor 204 and/or the DSP 220.

Figure 16A:
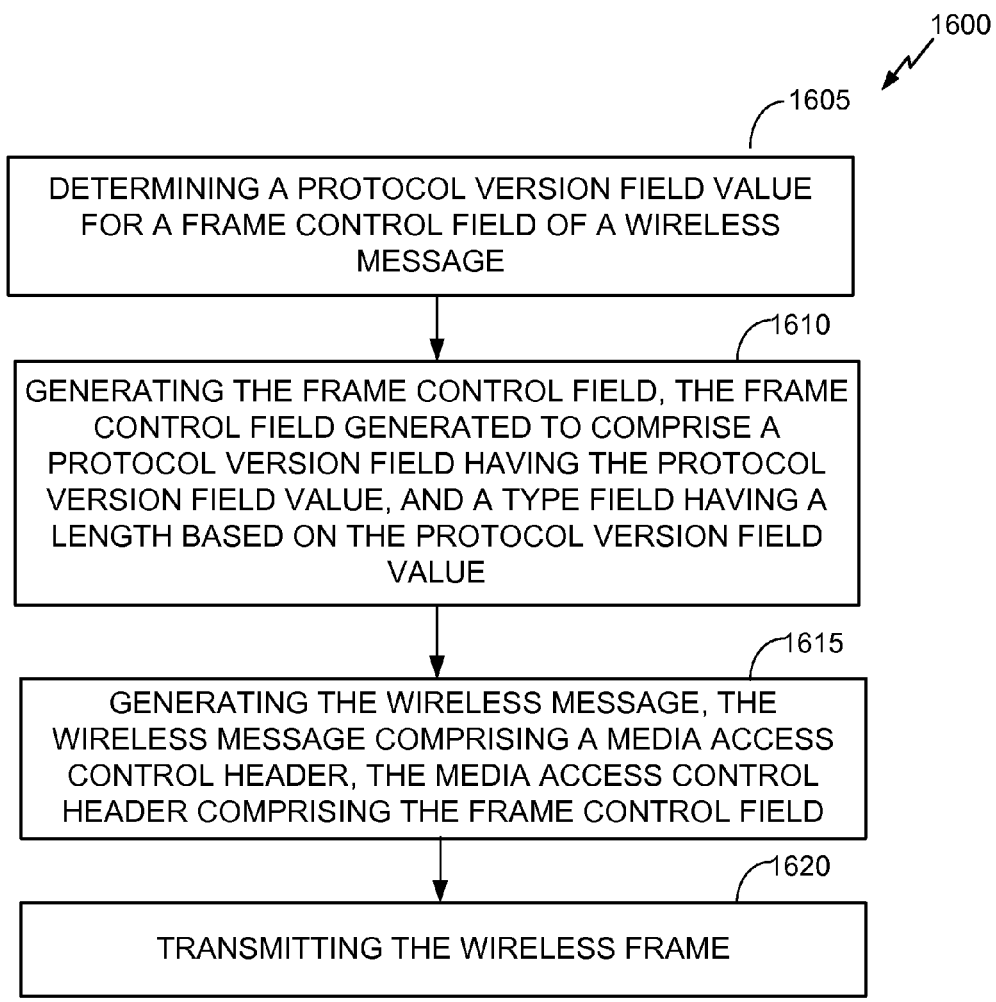
FIG. 16A illustrates an aspect of a method for transmitting a wireless communication frame.

FIG. 16A illustrates an aspect of a method 1600 for transmitting a wireless frame. The wireless frame may be generated at either the AP 104 or the STA 106 and transmitted to another node in the wireless network 100. Although the method 1600 is described below with respect to elements of the wireless device 202, those having ordinary skill in the art will appreciate that other components may be used to implement one or more of the steps described herein.

In some aspects, method 1600 may be utilized to provide for improved utilization of bits within the wireless frame to enable a larger number of frame types to be indicated. For example, in known methods, a frame type field may be defined to be two bits in length. This provides for a maximum of four different frame types to be indicated. By providing additional formats of the wireless frame that include a type field larger than two bits, additional frame types may be indicated by the wireless frame. In some aspects, a protocol version field of the wireless frame is utilized to determine the length of the type field, and in some aspects, a subtype field of the wireless frame. In some aspects, the wireless message referenced in method 1600 may include a media access control header, such as the media access control header 300 described with respect to FIG. 3, 500 described with respect to FIG. 5A, 600a of FIG. 6A, 600b of FIG. 6B, 600d of FIG. 6D, 700a of FIG. 7A, 700b of FIG. 7B, 1000 of FIG. 10, or 1200 of FIG. 12. The media access control header may include a frame control field. In various aspects, the frame control field may conform to one of the frame control field formats 305a, 305b, 505, 605b, 705b, 1005a, 1005b, 1205a, or 1205b.

In block 1605, a protocol version field value for a frame control field of a wireless message is determined. In some aspects, determination of the protocol version field may be based on a type of wireless message that will be transmitted in block 1620 (described below). For example, if a "short management frame" will be transmitted, the protocol version field value may be determined to be a first value. If a regular or long control frame or a regular or long management frame, for example, is to be transmitted, the protocol version field value may be determined to be a different, second value.

In block 1610, the frame control field is generated. The frame control field is generated to include a protocol version field having the protocol version field value determined in block 1605. A type field length is determined based on the protocol version field version. The frame control field is generated to include a type field with the determined length. In some aspects, the frame control field is determined to have a length of two bits based on the protocol version field value. For example, a protocol version field value of zero may indicate a type field length of two bits in some aspects. In these aspects, wireless messages with a protocol version field of zero can indicate up to four unique message types based on the two bit type field.

In some other aspects, the frame control field is determined to have a length of three bits based on the protocol version field. For example, a protocol version field value of one (1) may indicate a type field length of three bits in some aspects.

In these aspects, wireless messages with a protocol version field of one (1) can indicate up to eight unique message types based on the three bit type field.

In some aspects, the frame control field is determined to have a length of four bits based on the protocol version field. For example, in some aspects, a protocol version field value of one may indicate a type field length of four bits in some aspects. In these aspects, wireless messages with a protocol version field of one can indicate up to sixteen unique message types based on the three bit type field.

In some aspects, the frame control field may also be generated to include a subtype field. A length of the subtype field may be determined based on the protocol version field value or the length of the type field. In some aspects, if the protocol version field value is a first value, the length of the type field is determined to be less than a length of the subtype field. For example, in some aspects, if the protocol version field value is zero (0), the length of the type field is two bits and the length of the subtype field is four bits. In some aspects, if the protocol version field value is a second value, the length of the type field is greater than or equal to a length of the subtype field. For example, in some aspects, if the protocol version field value is one (1), the length of the type and subtype fields are equal. In some aspects, both fields are three bits long. In some other aspects, if the protocol version field value is one (in some implementations) or two (in some other implementations), the length of the type and subtype fields are determined to be four bits and two bits respectively.

In some aspects, the combined length of the type and subtype field is six bits. For example, if the type field is three bits in length, the subtype field will be determined to be three bits in length, such that the combined length of the type and subtype fields is six bits in length. If the type field is two bits in length, the subtype field will be determined to be four bits in length, again, such that the combined length of the type and subtype fields is six bits in length. If the type field is four bits in length, the subtype field will be determined to be two bits in length. Other combined lengths are contemplated in other implementations.

In some aspects, a particular combination of values in the protocol version, type and subtype fields may indicate a particular frame type. For example, a wireless frame that includes a protocol version field with a value of one (1), and a type field with a value of (1) may indicate a "short" management frame. A wireless frame that includes a protocol version field with a value of one (1), a type field with a value of (1) and a subtype field value of three (3) may indicate a resource allocation frame, such as the resource allocation frame 1000 shown in FIG. 10 above. In some aspects, the frame control field of the resource allocation frame is further generated to include a group indication field. The group indication field may be generated to indicate a group of devices to which the resource allocation frame applies.

In some aspects, a wireless frame that includes a protocol version field with a value of one (1), a type field with a value of one (1), and a subtype field value of two (2) may indicate a "short" probe response frame as shown by frame 1200 in FIG. 12.

In block 1615, a wireless message is generated that includes a media access control header including the frame control field. In various aspects, the frame control field may substantially conform to any of the frame control field formats discussed above with respect to FIGS. 3-13B. In block 1620, the wireless frame is transmitted.

Figure 16B:
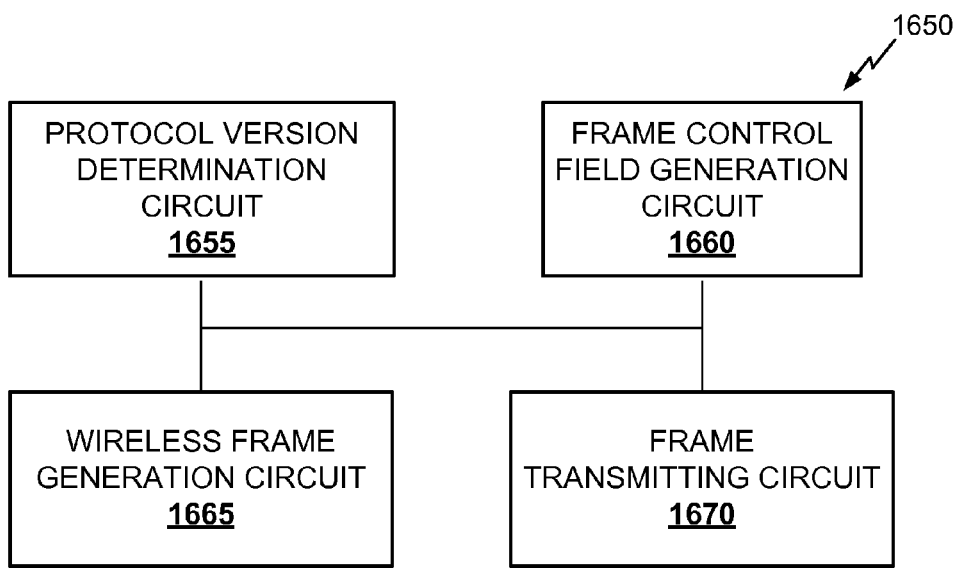
FIG. 16B is a functional block diagram of an exemplary wireless device that may be employed within a wireless communication system.

FIG. 16B is a functional block diagram of an exemplary wireless device 1650 that may be employed within the wireless communication system 100. The device 1650 comprises a protocol version determination circuit 1655. The protocol version determination circuit 1655 may be configured to perform one or more of the functions discussed above with respect to block 1605. In some aspects, the protocol version determination circuit 1655 corresponds to the processor 204. The device 1650 further includes a frame control field generation circuit 1660. The frame control field generation circuit 1660 may be configured to perform one or more of the functions discussed above with respect to block 1610. In some aspects, the frame control field generation circuit 1660 corresponds to the processor 204. The device 1650 further comprises a wireless frame generating circuit 1665. The wireless frame generating circuit 1665 may be configured to perform one or more of the functions discussed above with respect to the block 1615 illustrated in FIG. 16A. The wireless frame generating circuit 1665 may correspond to one or more of the processor 204 and/or the DSP 220. The device 1650 further comprises a frame transmitting circuit 1670 for wirelessly transmitting the generated frame. The frame transmitting circuit 1670 may be configured to perform one or more of the functions discussed above with respect to the block 1620 illustrated in FIG. 16A. The frame transmitting circuit 1670 may correspond to the transmitter 210 and/or the processor 204.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
   determining a protocol version field value for a frame control field of a wireless message;
   generating the frame control field, the frame control field generated to comprise a protocol version field having the protocol version field value, and a type field having a length based on the protocol version field value;
   generating the wireless message, the wireless message comprising a media access control header, the media access control header comprising the frame control field; and
   transmitting the wireless frame.

2. The method of claim 1, further comprising generating the frame control field to further comprise a subtype field, a length of the subtype field based on the length of the type field.

3. The method of claim 2, further comprising determining that the length of the type field is greater than or equal to the length of the subtype field if the protocol version field value is equal to a first value, and determining that the length of the type field is less than the length of the subtype field if the protocol version field value is equal to a second value.

4. The method of claim 1, further comprising generating the type field to have a first value and the subtype field to have a second value, the value of the type field and the value of the subtype field indicating the wireless frame is a probe response frame.

5. The method of claim 1, further comprising generating the type field to have a first value and the subtype field to have a second value, the value of the type field and the value of the subtype field indicating the wireless frame is a resource allocation frame.

6. The method of claim 5, further comprising generating the frame control field of the resource allocation frame to comprise a group indication field.

7. The method of claim 1, wherein the media access control header is generated as a block acknowledgment target wake time media access control header, the method further comprising generating the media access control header to independently indicate a receive status for 32 MSDUs and A-MSDUs.

8. The method of claim 1, further comprising generating the media access control header to include a starting sequence control field, wherein the starting sequence control field comprises a starting sequence number field and a traffic identifier for a block acknowledgement target wake time (BAT TID).

9. The method of claim 8, wherein the frame control field indicates the wireless frame is a block acknowledgement target wake time frame, and the starting sequence number field is 12 bits in length.

10. The method of claim 1, wherein the frame control field indicates whether the media access control header indicates a duration until the next target wake time or a partial timestamp.

11. The method of claim 10, wherein a length of the media access control header is the same regardless of whether the media access control header indicates a duration until the next target wake time or a partial timestamp.

12. An apparatus for communicating in a wireless network, the apparatus comprising
a processing system configured to
determine a protocol version field value for a frame control field of a wireless message,
generate the frame control field, the frame control field generated to comprise a protocol version field having the protocol version field value, and a type field having a length based on the protocol version field value,
generate the wireless message, the wireless message comprising a media access control header, the media access control header comprising the frame control field, and
transmit the wireless frame.

13. The apparatus of claim 12, wherein the processing system is further configured to generate the frame control field to further comprise a subtype field, a length of the subtype field based on the length of the type field.

14. The apparatus of claim 13, wherein the processing system is further configured to determine that the length of the type field is greater than or equal to the length of the subtype field if the protocol version field value is equal to a first value, and determine that the length of the type field is less than the length of the subtype field if the protocol version field value is equal to a second value.

15. The apparatus of claim 12, wherein the processing system is further configured to generate the type field to have a first value and the subtype field to have a second value, the value of the type field and the value of the subtype field indicating the wireless frame is a probe response frame.

16. The apparatus of claim 12, wherein the processing system is further configured to generate the type field to have a first value and the subtype field to have a second value, the value of the type field and the value of the subtype field indicating the wireless frame is a resource allocation frame.

17. The apparatus of claim 16, wherein the processing system is further configured to generate the frame control field of the resource allocation frame to comprise a group indication field.

18. A method of communicating in a wireless network, the method comprising:
receiving a wireless communication frame;
decoding the wireless communication frame to identify a media access control header;
decoding the media access control header to identify a frame control field;
decoding the frame control field to determine a value of a protocol version field;
determining a length of a type field in the frame control field based on the value of the protocol version field;
determining a value of the type field based on the length; and
processing the wireless communication frame based on the type field value.

19. The method of claim 18, further comprising:
decoding the frame control field to further determine a length of a subtype field based on the length of the type field; and
determining a value of the subtype field based on the length of the subtype field.

20. The method of claim 19, further comprising determining that the length of the type field is greater than or equal to the length of the subtype field if the protocol version field value is equal to a first value, and determining that the length of the type field is less than the length of the subtype field if the protocol version field value is equal to a second value.

21. The method of claim 19, further comprising:
determining the type field has a first value and the subtype field has a second value; and
decoding the wireless communication frame as a probe response frame based on the determination.

22. The method of claim 19, further comprising:
determining the type field has a third value and the subtype field has a fourth value; and
decoding the wireless frame as a resource allocation frame based on the determination.

23. The method of claim 22, further comprising decoding a group indication field in the frame control field based on the wireless frame being a resource allocation frame.

* * * * *